United States Patent [19]
White

[11] 3,964,072
[45] June 15, 1976

[54] SUPPRESSION OF UNWANTED RADIATION FROM UNAVOIDABLE OPENINGS IN SHIELDED ENCLOSURES

[75] Inventor: Emery A. White, Charlottesville, Va.

[73] Assignee: General Electric Company, Waynesboro, Va.

[22] Filed: Feb. 25, 1975

[21] Appl. No.: 552,989

[52] U.S. Cl. ............................. 346/146; 174/35 R; 333/81 B
[51] Int. Cl.² .......................................... H01P 1/22
[58] Field of Search ........ 307/91; 174/35 R, 35 MS; 346/146, 110 V; 333/73 R, 73 W, 81 R, 81 A; 325/119, 123

[56] References Cited
UNITED STATES PATENTS

| | | | |
|---|---|---|---|
| 3,205,459 | 9/1965 | Adams | 333/81 R X |
| 3,624,335 | 11/1971 | Dench | 333/73 W X |
| 3,745,466 | 7/1973 | Pisano | 325/119 |
| 3,821,463 | 6/1974 | Bakker | 174/34 MS |
| 3,851,282 | 11/1974 | Watson | 333/73 W |

*Primary Examiner*—Paul L. Gensler
*Attorney, Agent, or Firm*—Michael Masnik

[57] ABSTRACT

A waveguide opening for moving paper in and/or out of a data printer employing wave attenuators and reflectors to suppress electromagnetic wave radiation generated within said printer from escaping through the paper opening.

6 Claims, 5 Drawing Figures

3,964,072

SUPPRESSION OF UNWANTED RADIATION FROM UNAVOIDABLE OPENINGS IN SHIELDED ENCLOSURES

BACKGROUND OF THE INVENTION

The present invention relates to an arrangement for suppressing unwanted electromagnetic wave radiation from unavoidable openings in shielded enclosures, and more particularly to depressing such radiation in data recorders which generate a wide spectrum of radiation frequencies in response to the processing of digital information such as coded pulse groups.

In data processors, various kinds of signals are involved. For example, electrical currents are generated which are associated with the operation of the power supply, with the operation of solenoids and with the occurrence or processing of coded pulse groups representing data. As is well known, recurrent pulses of the type handled in data processing equipment have associated therewith a harmonic frequency content sufficient to produce electromagnetic radiation over a wide spectrum of frequencies. Under certain circumstances it is desirable that such radiation be limited to the shielded enclosure surrounding the data processor and not be permitted to escape through unavoidable openings in the processor for interference with the operation of other equipment.

Attempts to control this radiation have been relatively unsuccessful in the past. For example, attempts to seal the opening by flaps, etc., have proved unsuccessful because the flap has to accommodate the width of the record medium which in most cases is a continuous sheet of paper. It is this paper width at the opening that controls the amount of electromagnetic radiation that is permitted to escape from the shielded enclosure and not the height of the opening. Attempts to merely coat the inside surface of the opening with a lossy material have been relatively unsuccessful because of the substantial thickness of coating that would be required. Other schemes based on controlling the opening size to extremely close tolerances and dimensions have resulted in interference with proper paper movement. Also, efforts to insert dielectric materials into the waveguide to absorb radiation have proved costly and difficult to implement because of the tendency for this approach to produce undesirable standing waves which is contrary to the objective of suppressing as great a spectrum of frequencies as possible.

SUMMARY OF THE INVENTION

Accordingly, it is one object of this invention to provide an improved arrangement for minimizing the escape of electromagnetic interference developed from unavoidable openings in a data processor operating with pulsed signals.

Another object of this invention is to provide an improved arrangement for minimizing escape of electromagnetic interference from unavoidable openings in electronic equipment.

A further object of this invention is to provide an improved arrangement for spoiling the propagation path of electromagnetic waves emanating from openings in electrical equipment to minimize escape of such waves from said opening.

Another object of this invention is to provide an improved arrangement for substantially minimizing the electromagnetic waves escaping from an unavoidable opening in otherwise sealed electronic equipment by providing a multiplicity of wave reflecting surfaces within the opening to direct waves repeatedly toward wave-absorbing material.

Another object of this invention is to provide a common wave scattering surface for a common waveguide passing a plurality of record mediums through a plurality of openings to minimize the escape of electromagnetic waves through such openings.

Briefly, in accordance with one aspect of the invention there is provided an elongated waveguide forming the opening for passing a record material such as sheet paper. The cross-sectional width of the waveguide is dimensioned to correspond substantially with the width of the record medium to maximize overall wave attenuation and to limit propagation of lower frequencies. A wave reflective, lossy material is provided along at least the wide surfaces of the waveguide. A reflector is included in the waveguide. The said reflector comprises a thin wave reflective sheet of material extending along and bearing corrugations along the length of the waveguide. Sheets of wave reflective, lossy material are positioned adjacent the extremities of the corrugation of said reflector. The corrugations are dimensioned in a geometrical pattern to cause multiple reflections of incident waves between the various surfaces of the wave reflective, lossy material.

BRIEF DESCRIPTION OF THE DRAWINGS

While the specification concludes with claims particularly pointing out and distinctly claiming the subject matter which is regarded as the present invention, it is believed that the invention will be better understood from the following description taken in connection with the accompanying drawings in which:

FIG. 2b is a cross-sectional view along the length of the guide shown in FIG. 2a.

FIG. 3b is a cross-sectional view along the width of the guide shown in FIG. 3a.

DETAILED DESCRIPTION OF A PREFERRED EMBODIMENT

Figure 1:
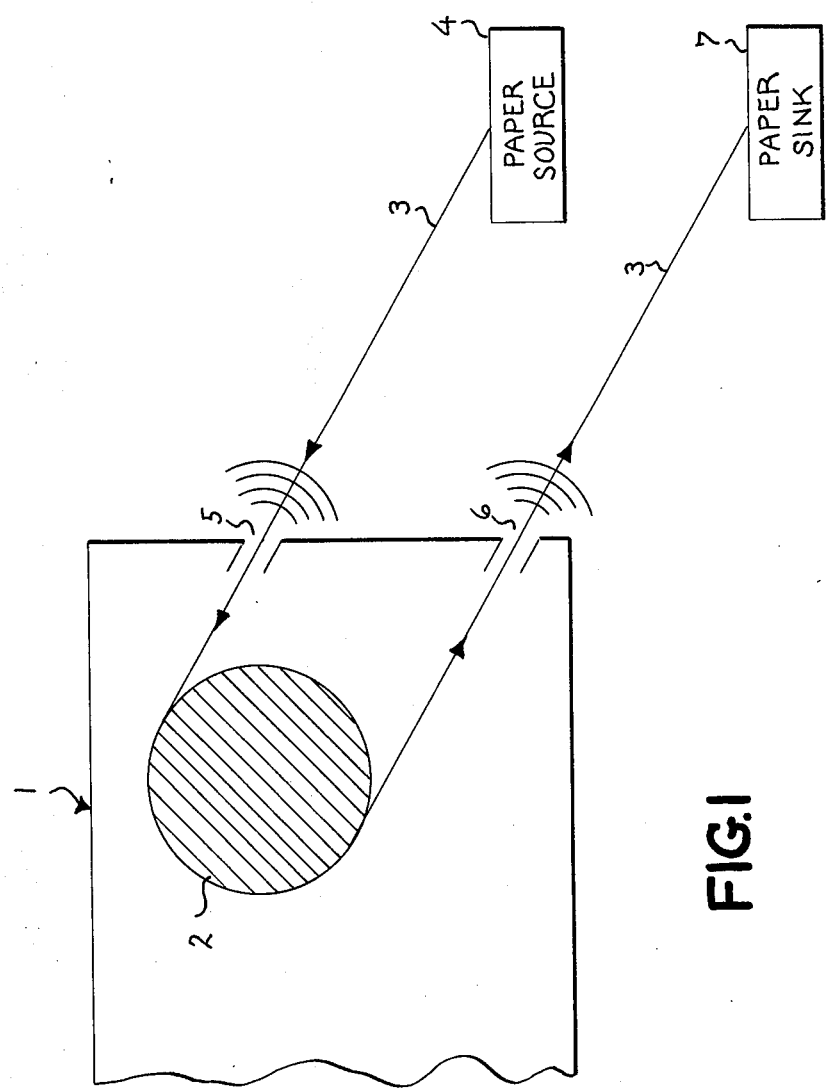
FIG. 1 illustrates schematically the nature of the undesirable radiation emanating from unavoidable openings in a recording enclosure where a record medium is moved into and out of said enclosure.

Referring to the drawings, and more particularly FIG. 1, there is shown a typical environment in which unwanted radiation escapes from a shielded enclosure. For purposes of illustration, FIG. 1 shows a printer enclosure 1 housing a platen 2 which is caused to rotate by means not shown to draw paper 3 from source 4 through the opening 5 into the enclosure 1 and to move the paper out of the opening 6 to a paper sink or receiving device 7. As is well known and previously mentioned, a printer generates a wide variety of signals in the form of recurrent pulses which have a harmonic frequency content sufficient to produce undesirable electromagnetic radiation within the enclosure. This radiation can escape through openings 5 and 6 and is shown symbolically by the curved radiation lines. This undesirable radiation under certain circumstances can interfere with the operation of other equipment in the vicinity of the printer enclosure. It would be desirable, therefore, to provide an arrangement for substantially eliminating this undesirable radiation.

Electromagnetic interference (EMI) is generally prevented by either absorbing or reflecting the energy before it escapes the containing vessel and becomes free. Reflection occurs when an electromagnetic wave encounters a change in impedance of the media in which it propagates. The physical laws obeyed by the reflection process are those which are exploited by the science of optics.

Absorption happens because of losses that occur once an electromagnetic field is able to enter a lossy medium. The losses may be either ohmic or molecular in nature. Ohmic losses occur in metals because their conductivity is finite. Molecular losses occur in dielectric and magnetic materials of high permittivity and permeability respectively. Losses result from molecular friction as dipoles align and realign at the frequency of the passing field. The lossy dielectric and magnetic materials are available commercially. They have controlled losses over a specified band of frequencies. However, they are costly and their impedance is almost always significantly different from free space. Hence, the commercial materials will not absorb or properly reflect unless they are specifically geometrically shaped for the purpose. For instance, as previously mentioned, a common method of achieving nearly complete absorption in a waveguide is to fill a large portion of the waveguide with a conically shaped lossy dielectric. This allows the impedance to change gradually from the characteristic impedance of the air dielectric to that of the lossy dielectric. The gradual change prevents reflection and thereby permits the absorption for which the material is designed. This represents a complex and costly approach.

The paper chute of the typical printer is in reality a waveguide undesirably suitable for ultra-high frequency (uhf) transmission. The energy suitable for transmission developed by the pulse signals involved in printer operation already exists in the form of uhf surface currents on the interior surfaces of the printer enclosure. A path exists for those currents to escape along the interior surfaces of the paper chute, out the end and thence onto the outside surfaces of the entire enclosure. The surface currents on the outside are undesirable because they generate uncontained EMI.

The EMI could be contained by completely filling the paper chute with lossy dielectric and milling a slot in the dielectric just tall enough to accommodate the thickness of a sheet of paper. However, this is expensive.

The interior currents could seemingly be prevented from entering the waveguide by "lossy coating" the inside surfaces of the waveguide. However, the space-born electromagnetic fields from within the enclosure would then enter the waveguide, set up new interior currents, which in turn would set up new and only slightly attenuated electromagnetic fields. The problem is that the coating is too thin to attenuate propagating electromagnetic fields once they enter the waveguide. Hence, an inexpensive means must be found, which prevents both surface currents and space-born electromagnetic fields from entering.

Figure 2A:
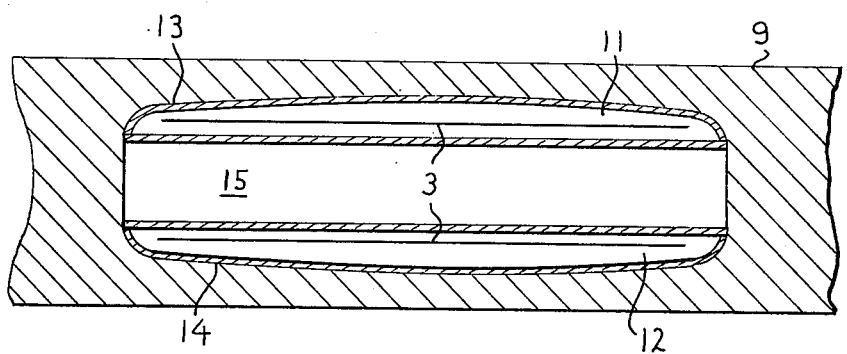
FIG. 2a illustrates one embodiment of the invention in the form of a cross-sectional view along the width of the guide or chute employed for receiving or exiting paper.

FIG. 2a illustrates one embodiment of the invention wherein paper 3 is drawn into a specially designed chute 9, formed for example, of aluminum. The invention consists of a shaped metallic honeycombed insert, which completely fills the interior of the paper chute 9 except for two thin slots 11 and 12 where paper enters at the top and leaves at the bottom of paper chute 9. The insert consists of magnetic silicon steel sheets similar to Arnold Engineering type AlS4, approximately 12 mils thick, formed as shown at 13 and 14 into elongated tubes for accepting the paper sheet 3 and located in near proximity to the corrugated extremities of the metallic reflector 15. This steel sheet material is wave reflective and lossy. That is, the electromagnetic energy portion which succeeds in penetrating into the sheet material is converted to heat. This combination of being reflective as to some of the incident energy and dissipative of the remaining energy is desirable as will be explained shortly. The metallic reflector 15 is shaped into trapezoidal corrugations. The peaks and troughs of the corrugations are unseen, but they run horizontally substantially the full width of the paper chute.

The manner in which the structure operates to suppress electromagnetic wave interferences is as follows. Uhf currents are unavoidably present on the interior surface of the metallic enclosure. These currents flow only at or near surfaces because of their high frequency characteristics. The currents encounter a large decrease in ohmic conductivity when they try to enter the paper chute on the silicon steel surfaces 13 or 14. This reflects them in part and prevents them from entering. The lower surface conductivity of the chute's interior surfaces is necessary, but insufficient for the containment of interference. In addition, electromagnetic fields must be prevented from entering the paper chute where they could set up surface currents anew. The corrugated reflector 15 further depicted in FIG. 2b reflects the electromagnetic waves and prevents some of the wave energy from entering the waveguide initially. Further wave energy attenuation then takes place within the chute considerably reducing the residuals that may have leaked past the initial reflection at the paper chute entrance. This phenomenon is caused by multiple reflections in and out of the silicon steel sheets 13 and 14. These additional multiple reflections are set off by successive corrugations of reflector 15 as the residual fields attempt to propagate further into the waveguide.

The attenuating properties of the inventive structure can be further explained with reference to FIG. 2b. The surface currents in 9 are prevented from entering along the interior surfaces of the paper chute 9 by the difference in conductivity between such lossy material surfaces 13 and 14 and the surface of chute 9. In addition, there are propagating electric fields depicted by arrows. The direction of the arrows signifies their direction of polarization. Their direction of propagation could conceivably be right to left for the vertical arrow and vertically in the plane of the paper for the horizontal arrow. The vertical arrow will be substantially reflected by the shape of the corrugated surface 15 in the plane of the chute opening. (Reflection is proportional to the cosine of the angle of incidence. The angle of incidence is the angle between the normal to the reflecting surface and the direction vector representing the direction of propagation.) The horizontal vector will also be reflected since the angle of incidence is not zero. The inclined vectors that could have a "zero" angle of incidence do not significantly exist because these must be propagated by surface currents. Since the box is a cavity whose walls are mostly vertical and horizontal, the fields that are not horizontally or vertically polarized would not be efficiently propagated within the typewriter enclosure.

Figure 2B:
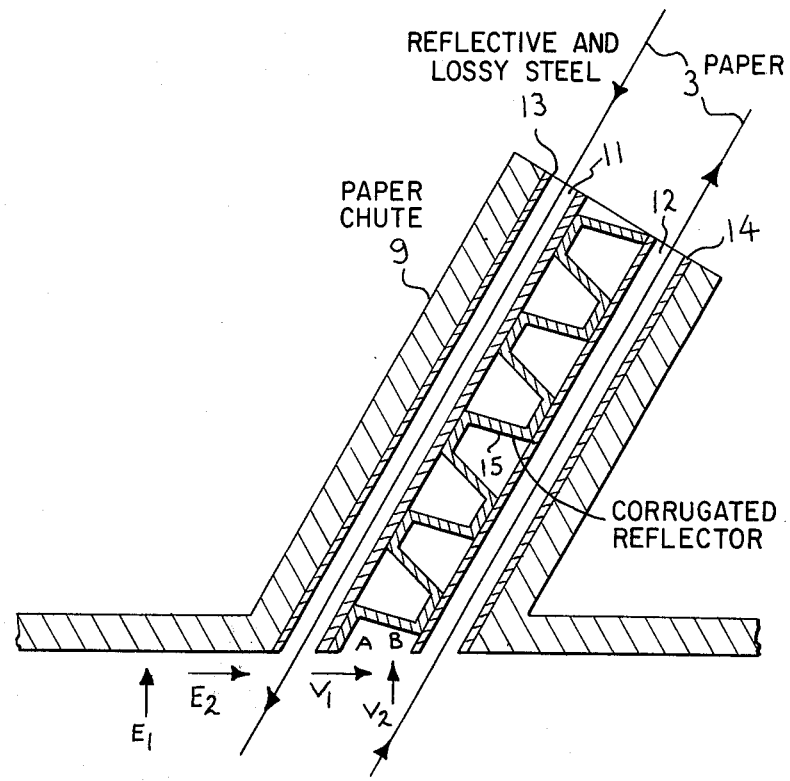

Any fields which do escape reflection from surfaces 13 and 14 of FIG. 2b will be repeatedly reflected in and out of the lossy silicon steel many, many times and thus would suffer adequate attenuation. The effectiveness of the disclosed invention has been found to be more than adequate by experiment in the laboratory. The cost is substantially less than for attenuators built from commercial absorber materials.

To measure the improvement in reducing unwanted radiation from the openings in the equipment enclosure, measurements were taken to indicate the amount of attenuation that resulted. To simulate the printer operation a self-interrupting relay was used as a signal generator. A 14 inch loop antenna was employed by having its plane aligned with one plane of the chute opening. The antenna to slot opening was of the order of 24 inches. A spectrum analyzer was connected to the antenna and produced the results indicated in the table below.

13½ inches × ⅜ inch × 7½ inches top, and 13½ inches × ¾ inch × 6½ inches bottom surface. The slot thus was angled up as shown in FIG. 2a. The following data was for the slot length described above. Obviously the attenuation improvement would be greater if the slot length was extended.

The lower end of the frequency range checked, namely 350 megacycles per second, was approximately the low frequency cut-off of the waveguide due to its physical dimensions. In a rectangular wavelength, the lowest frequency passed by the waveguide has a wavelength of the order of twice its greatest dimension. Below this the waveguide was not a conductor of electromagnetic interference. The upper limit of 980 megacycles per second represents essentially the upper limit of the frequencies generated by a printer operating in response to coded pulse groups. Comparison of the decibel readings with and without the invention indicate the substantial elimination of unwanted radiation from unavoidable openings in the printer enclosure.

Figure 3A:
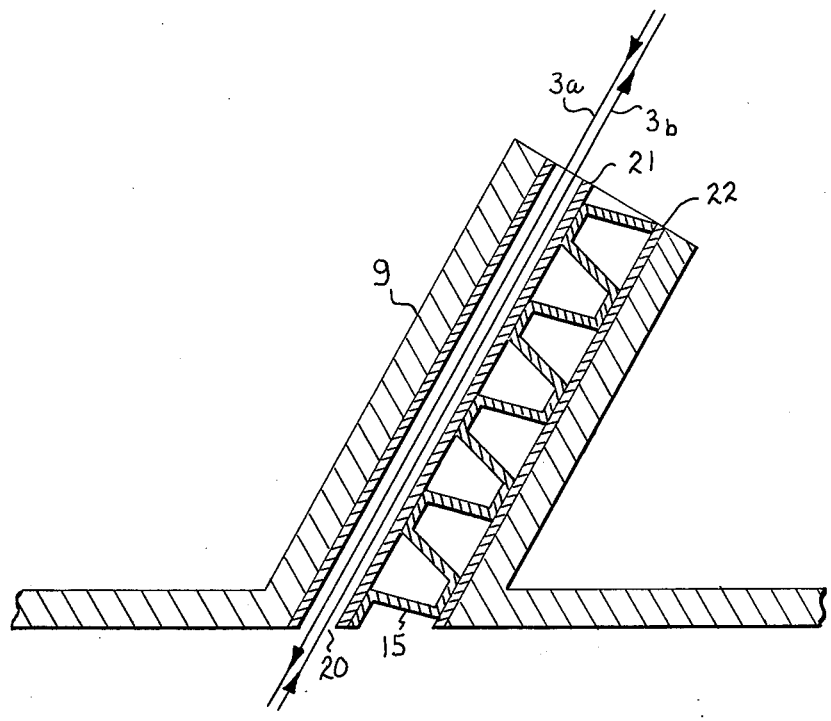
FIG. 3a is a further embodiment of the invention in the form of a cross-sectional view along the length of the guide for handling paper in and out of the recorder.

While the invention has been described in terms of an insert which provides two spaced openings, one for entry and the other for exit of the paper, a single opening can be provided as set forth in FIG. 3a. For pur-

| Frequency MC | Without the Invention Electromagnetic Interference in Decibels Relative to a Given Reference | With the Invention Electromagnetic Interference in Decibels Relative to said Given Reference | With the Invention Attenuation (ie, Improvement) in Decibels |
|---|---|---|---|
| 350 | — | — | — |
| 355 | 0 | −18 | 18 |
| 365 | 0 | −12 | 12 |
| 380 | −9 | −24 | 15 |
| 400 | −12 | −30 | 18 |
| 410 | −3 | −18 | 15 |
| 420 | 0 | −24 | 24 |
| 425 | +6 | −15 | 21 |
| 435 | — | — | — |
| 440 | 0 | −30 | 30 |
| 460 | +3 | −24 | 27 |
| 480 | 0 | −30 | 30 |
| 490 | +3 | −30 | 33 |
| 500 | 0 | −24 | 24 |
| 510 | 0 | −21 | 21 |
| 520 | +3 | −20 | 23 |
| 540 | −3 | −30 | 27 |
| 550 | +18 | −6 | 24 |
| 565 | 0 | −18 | 18 |
| 572 | +3 | −12 | 15 |
| 590 | −3 | −26 | 23 |
| 600 | −9 | −24 | 15 |
| 620 | 0 | −18 | 18 |
| 650 | 0 | −18 | 18 |
| 670 | −15 | −30 | 15 |
| 685 | 0 | −15 | 15 |
| 700 | 0 | −15 | 15 |
| 720 | 0 | −24 | 24 |
| 750 | +3 | −18 | 21 |
| 780 | −6 | −28 | 22 |
| 800 | 0 | −24 | 24 |
| 820 | 0 | −20 | 20 |
| 850 | +3 | −18 | 21 |
| 870 | −3 | −18 | 15 |
| 880 | −3 | −15 | 12 |
| 890 | 0 | −12 | 12 |
| 910 | −3 | −15 | 12 |
| 920 | −3 | −20 | 17 |
| 930 | −3 | −15 | 12 |
| 950 | −6 | −20 | 14 |
| 980 | 0 | −30 | 30 |

Figure 3B:
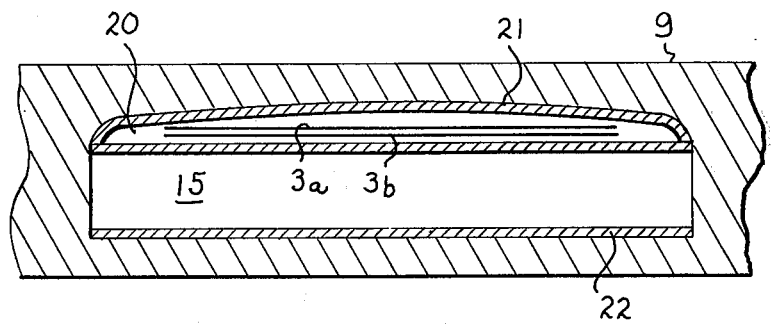

Readings were taken on the analyzer scope with and without the attenuator. The attenuator of the analyzer was adjusted so that the signal without the honeycomb insert was approximately zero db on the scope face. Attenuation is the difference between the readings with and without the honeycomb. The slot dimensions were poses of simplicity, common reference numerals have been retained in FIG. 3 for that used in the other drawings. In place of having two openings 11 and 12 as shown in FIG. 2b, use is made of only one opening 20 wherein the incoming paper 3a, as well as the outgoing paper sheet 3b, are confined to the same opening 20.

Depending upon the characteristics of the incoming and outgoing paper sheet, that is whether they can pass one another without binding or interference, the openings can be held to one thereby substantially simplifying the structure and reducing its cost. Also by resorting to one opening, the opportunities for suppressing undesirable radiation are increased. As mentioned before, the corrugated reflector 15 may be formed of aluminum thin enough to facilitate the forming of a pattern of corrugations which, for example, may be repetitively trapezoidal in cross-section along the length of the waveguide or chute to provide repeated, multiple reflection surfaces for incident waves. The coatings 21 and 22 are formed of a wave reflective, lossy material as for example silicon steel to convert that portion of the incident electromagnetic interference that penetrates the steel surface into heat and to enable repetitive reflections so that in passage down the chute the attenuation by conversion of heat is cumulative and sufficient.

While the invention has been described with particular reference to the construction shown in the drawings, it is understood that further modification may be made without departing from the true spirit and scope of the invention, which is defined by the claims appended hereto.

What I claim as new and desire to secure by Letters Patent of the United States is:

1. In a data processor wherein a record medium in the form of a sheet is required to be moved through an opening in the processor, means for minimizing electromagnetic waves generated within the processor from escaping through said opening comprising an elongated waveguide forming said opening, the cross-sectional width of said waveguide dimensioned to correspond substantially with the width of said medium to maximize overall wave attenuation and to limit propagation of lower frequencies, a wave reflective, lossy material provided along at least the wide surfaces of said waveguide, a reflector included in said waveguide, said reflector comprising a wave reflective sheet of material extending along the length of the waveguide and dimensioned with wave reflecting corrugations along its length, sheets of wave reflective, lossy material positioned adjacent the extremities of the corrugations of said reflector, said corrugations dimensioned in a geometrical pattern to cause repeated multiple reflections of incident waves between the various surfaces of the wave reflective, lossy material.

2. An arrangement according to claim 1 wherein said medium is moved in one direction between the lossy surface associated with one wide dimension of said waveguide and the lossy surface associated with one extremity of said reflector corrugations and said medium is moved in another direction between the lossy surface associated with the other wide dimension of said waveguide and the lossy surface associated with the other extremity of said reflector corrugations.

3. An arrangement according to claim 1 wherein said lossy surface associated with one wide dimension of said waveguide and one extremity of said reflector corrugations is a common surface, and means for moving said record medium in both directions between the lossy surface associated with the other wide dimension of said waveguide and the lossy surface associated with the other extremity of said reflector corrugations.

4. An arrangement according to claim 1 wherein the pattern of said corrugations is repetitively trapezoidal in cross-section along the length of the waveguide.

5. An arrangement according to claim 1 wherein said lossly material is magnetic silicon steel.

6. An arrangement according to claim 5 wherein said reflector comprises aluminum material.

* * * * *